(12) United States Patent
Namuduri et al.

(10) Patent No.: US 10,654,370 B2
(45) Date of Patent: *May 19, 2020

(54) APPARATUS AND METHOD FOR FLEXIBLE DC FAST CHARGING OF AN ELECTRIFIED VEHICLE

(71) Applicant: GM GLOBAL TECHNOLOGY OPERATIONS LLC, Detroit, MI (US)

(72) Inventors: Chandra S. Namuduri, Troy, MI (US); Thomas W. Nehl, Shelby Township, MI (US); Lei Hao, Troy, MI (US); Michael Harpster, Oakland Township, MI (US); Andrew K. Chandler, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,648

(22) Filed: Aug. 5, 2019

(65) Prior Publication Data

US 2019/0351778 A1 Nov. 21, 2019

Related U.S. Application Data

(63) Continuation of application No. 15/824,525, filed on Nov. 28, 2017, now Pat. No. 10,369,896.

(51) Int. Cl.
*B60L 53/10* (2019.01)
*B60L 53/16* (2019.01)
(Continued)

(52) U.S. Cl.
CPC .............. *B60L 53/11* (2019.02); *B60L 50/66* (2019.02); *B60L 53/16* (2019.02); *B60L 53/65* (2019.02);
(Continued)

(58) Field of Classification Search
CPC ........................................................ B60L 53/11
(Continued)

(56) References Cited

U.S. PATENT DOCUMENTS

| | | | |
|---|---|---|---|
| 4,019,106 A | 4/1977 | Van Doren | |
| 4,296,363 A | 10/1981 | Blake et al. | |

(Continued)

FOREIGN PATENT DOCUMENTS

| | | |
|---|---|---|
| JP | 2007244102 A | 9/2007 |
| JP | 2010057288 A | 3/2010 |

*Primary Examiner* — Yalkew Fantu
(74) *Attorney, Agent, or Firm* — Quinn IP Law

(57) ABSTRACT

An apparatus for flexible DC fast charging of an electrified vehicle includes a charge receptacle and a vehicle charging controller programmed to establish a wireless communication with a charging station. The apparatus further includes a reconfigurable energy storage system selectively and electrically connected to the charge receptacle. The reconfigurable energy storage system includes a first rechargeable energy storage device selectively and electrically connected to the charge receptacle, a second rechargeable energy storage device selectively connected to the charge receptacle, and a plurality of low-loss switching devices selectively connected to the first rechargeable energy storage device and the second rechargeable energy storage device. The vehicle charging controller is programmed to selectively actuate the plurality of low-loss switching devices based on the charging voltage of the charging station such that a nominal voltage of the reconfigurable energy storage system matches the charging voltage of the charging station.

20 Claims, 3 Drawing Sheets

(51) Int. Cl.
    *B60L 53/65*     (2019.01)
    *B60L 50/60*     (2019.01)

(52) U.S. Cl.
    CPC ....... *B60L 2210/30* (2013.01); *B60L 2230/16* (2013.01)

(58) Field of Classification Search
    USPC .......................................................... 320/109
    See application file for complete search history.

(56) References Cited

U.S. PATENT DOCUMENTS

| | | |
|---|---|---|
| 4,814,631 A | 3/1989 | Jackson |
| 5,786,681 A | 7/1998 | Kalpathi |
| 6,166,500 A | 12/2000 | Makaran |
| 6,803,746 B2 | 10/2004 | Aker et al. |
| 7,489,048 B2 | 2/2009 | King et al. |
| 9,024,586 B2 | 5/2015 | Vance et al. |
| 9,071,067 B2 | 6/2015 | Seethaler et al. |
| 9,450,440 B2 | 9/2016 | Yebka et al. |
| 9,481,357 B2 | 11/2016 | Namuduri et al. |
| 2011/0043143 A1 | 2/2011 | Alter |
| 2012/0161698 A1* | 6/2012 | Anderson ............. H02J 7/0077 320/109 |
| 2012/0181854 A1 | 7/2012 | Gopalakrishnan et al. |
| 2013/0049677 A1* | 2/2013 | Bouman .................. B60L 1/003 320/106 |
| 2013/0110337 A1 | 5/2013 | Kondoh |
| 2013/0307475 A1* | 11/2013 | Kishiyama ............ H02J 7/0027 320/109 |
| 2014/0195092 A1 | 7/2014 | Saito |
| 2014/0354060 A1 | 12/2014 | Lee et al. |
| 2014/0356686 A1* | 12/2014 | Namou .................... H01M 8/04 429/121 |
| 2015/0134231 A1 | 5/2015 | Li et al. |
| 2015/0139761 A1* | 5/2015 | Qi ............................. E04H 6/12 414/253 |
| 2015/0175026 A1* | 6/2015 | Uyeki .................... H01M 10/44 320/109 |
| 2015/0207345 A1 | 7/2015 | Greening et al. |
| 2015/0258984 A1* | 9/2015 | Atluri ................... B60W 10/06 701/22 |
| 2015/0351292 A1 | 12/2015 | Chang et al. |
| 2016/0009194 A1 | 1/2016 | Katayama et al. |
| 2016/0079751 A1 | 3/2016 | Ide et al. |
| 2016/0090054 A1 | 3/2016 | Powell |
| 2016/0129796 A1 | 5/2016 | Tomura et al. |
| 2017/0002744 A1 | 1/2017 | Poumarede et al. |
| 2017/0279275 A1 | 9/2017 | Yamamoto et al. |
| 2019/0126761 A1 | 5/2019 | Verbridge |

\* cited by examiner

APPARATUS AND METHOD FOR FLEXIBLE DC FAST CHARGING OF AN ELECTRIFIED VEHICLE

CROSS-REFERENCE TO RELATED APPLICATIONS

This application is a continuation of U.S. patent application Ser. No. 15/824,525, filed on Nov. 28, 2017, the disclosure of which is hereby incorporated by reference in its entirety.

INTRODUCTION

The present disclosure relates to an apparatus and method for flexible DC fast charging of an electrified vehicle.

Electrified vehicles, such as hybrid vehicles and plug-in vehicles, can be electrically charged. This electrical charge energizing an electric motor, which is used for propulsion.

SUMMARY

Some electric and plug-in hybrid vehicles suffer from the disadvantage of long recharging times relative to the refueling time of internal combustion engine-based vehicles. Recharging a 200-mile range electric vehicle may take several hours using standard on-board chargers (with up to 11 kW maximum rating), whereas an internal combustion engine-based vehicle may merely need well below 15 minutes for the same range. DC fast charging at 50 kW and higher is being proposed for occasional convenience in addition to the AC Charging capability using the on-board charger for regular charging. In order to match the recharging times of less than 15 minutes for a long range (250~400 mile) capable Electric Vehicle, high voltage (800V), high power (150~350 kW) DC fast charging is being developed. Some electric vehicles that use lower voltage (~400V) energy storage systems cannot take advantage of these new high voltage (800V), high power (150~350 kW) charging stations.

The present disclosure describes an apparatus for reducing the charging time of a plug-in electric or hybrid vehicle having, for example, a nominal charging voltage that is equal to or less than 400V using a high power (i.e., 150 to 350 kW), higher voltage (i.e., 800V) charging station using a reconfigurable energy storage system. Vehicle charging controller to infrastructure (V-2-X) communication is used to determine the charging voltage of the charging station prior to initiating high power DC fast charging. The present disclosed apparatus enables increased charging rate of an electrified vehicle with a lower voltage (e.g., 400V) storage device without increasing the current rating of charge port. The present disclosed apparatus enables the use of the new high power (i.e., 150 to 350 kW), higher voltage (i.e., 800V) charger infrastructure (i.e., charging station) without replacing the low voltage (i.e., 400V) energy storage device and other propulsion system components such as the drive unit and the power inverter with higher voltage rated ones. Due to reduced charging time achieved by using the presently disclosed apparatus, customer satisfaction is improved, leading to more customer acceptance of electrified vehicles (i.e., plug-in vehicle and hybrid vehicles). The presently disclosed apparatus also provides fault tolerance by isolating faulty sections of the energy storage system, thereby preventing customer walk-home. The presently disclosed apparatus allows the use of a utilizing high power (i.e., 150 to 350 kW), higher voltage (i.e., 800V) charging station DC fast charging station with a nominal lower voltage (i.e., 400V) energy storage device having power switching devices, and a communication scheme to predetermine the energy storage configuration of the vehicle. The presently disclosed apparatus also enables the use of a nominal 800V battery that needs to be charged with 400V charger as well for backward compatibility of a future 800V battery system.

In certain embodiments, the apparatus for flexible DC fast charging of an electrified vehicle includes a charge receptacle configured to receive a charge port to electrically charge the electrified vehicle and a vehicle charging controller programmed to establish a wireless and/or a wired communication with a charging station. The vehicle charging controller is programmed to wirelessly receive a wireless signal from the charging station. The wireless signal is indicative of a charging voltage of the charging station. The apparatus further includes a reconfigurable energy storage system selectively and electrically connected to the charge receptacle. The reconfigurable energy storage system includes a first rechargeable energy storage device selectively and electrically connected to the charge receptacle, a second rechargeable energy storage device selectively and electrically connected to the charge receptacle, and a plurality of low-loss switching devices selectively connected to the first rechargeable energy storage device and the second rechargeable energy storage device. Each of the plurality of low-loss switching devices is in communication with the vehicle charging controller. The vehicle charging controller is programmed to selectively actuate the plurality of low-loss switching devices based on the charging voltage of the charging station such that a nominal voltage of the reconfigurable energy storage system matches the charging voltage of the charging station.

The vehicle charging controller is programmed to selectively actuate the plurality of low-loss switching devices based on the charging voltage of the charging station in order to electrically connect the first rechargeable energy storage device and the second rechargeable energy storage device in series such that the nominal voltage of the reconfigurable energy storage system matches the charging voltage of the charging station. The vehicle charging controller is programmed to selectively actuate the plurality of low-loss switching devices based on the charging voltage of the charging station in order to electrically connect the first rechargeable energy storage device and the second rechargeable energy storage device in parallel such that the nominal voltage of the reconfigurable energy storage system matches the charging voltage of the charging station. The plurality of low-loss switching devices includes a first low-loss switching device, a second low-loss switching device, and a third low-loss switching device. Each of the first low-loss switching device, the second low-loss switching device, and the third low-loss switching device is selectively connected to the first rechargeable energy storage device and the second rechargeable energy storage device. Each of the first low-loss switching device, the second low-loss switching device, and the third low-loss switching device is in communication with the vehicle charging controller. Each of the first low-loss switching device, the second low-loss switching device, and the third low-loss switching device has an on-state and an off-state. The vehicle charging controller is programmed to determine the charging voltage of the charging station based on the wireless signal received from the charging station. The charging voltage of the charging station is one of a first voltage or a second voltage, and the second voltage is greater than the first voltage. The vehicle charging controller is programmed to determine that the charging voltage of the charging station is the first voltage. The vehicle charging controller is programmed to command the first low-loss switching device and the second low-loss switching device to be in the on-state and to command the third low-loss switching device to be in the off-state, thereby electrically connecting the first rechargeable energy storage device and the second rechargeable energy storage device in parallel in response to determining that the charging voltage of the charging station is the first voltage.

The vehicle charging controller is programmed to determine that the charging voltage of the charging station is the second voltage. The vehicle charging controller is programmed to command the first low-loss switching device and the second low-loss switching device to be in the off-state and to command the third low-loss switching device to be in the on-state, thereby electrically connecting the first rechargeable energy storage device and the second rechargeable energy storage device in series in response to determining that the charging voltage of the charging station is the second voltage. The vehicle charging controller is in communication with the first rechargeable energy storage device such that the vehicle charging controller is programmed to determine that the first rechargeable energy storage device is faulty. In response to determining that the first rechargeable energy storage device is faulty, the vehicle charging controller is programmed to command the first low-loss switching device and the third low-loss switching device to be in the off-state and to command the second low-loss switching device to be in the on-state to bypass the first rechargeable energy storage device that is faulty. The vehicle charging controller is in communication with the second rechargeable energy storage device such that the vehicle charging controller is programmed to determine that the second rechargeable energy storage device is faulty. In response to determining that the second rechargeable energy storage device is faulty, the vehicle charging controller is programmed to command the second low-loss switching device and the third low-loss switching device to be in the off-state and to command the first low-loss switching device to be in the on-state to bypass the second rechargeable energy storage device that is faulty.

The present disclosure also describes an electrified vehicle. The electrified vehicle includes a charge receptacle configured to receive a charge port to electrically charge the electrified vehicle and a vehicle charging controller programmed to establish a wireless communication with a charging station. The vehicle charging controller is programmed to wirelessly receive a wireless signal from the charging station. The wireless signal is indicative of a charging voltage of the charging station. The electrified vehicle further includes a reconfigurable energy storage system selectively and electrically connected to the charge receptacle. The reconfigurable energy storage system includes a first rechargeable energy storage device selectively and electrically connected to the charge receptacle, a second rechargeable energy storage device selectively and electrically connected to the charge receptacle, and a plurality of low-loss switching devices selectively connected to the first rechargeable energy storage device and the first rechargeable energy storage device. Each of the plurality of low-loss switching devices is in communication with the vehicle charging controller. The vehicle charging controller is programmed to selectively actuate the plurality of low-loss switching devices based on the charging voltage of the charging station such that a nominal voltage of the reconfigurable energy storage system matches the charging voltage of the charging station. The electrified vehicle includes a direct current (DC) wiring electrically connecting the charge receptacle and the reconfigurable energy storage system, a power electronics bay electrically connected to the charge receptacle and the reconfigurable energy storage system, and an alternating current (AC) wiring electrically connecting the power electronics bay to the charge receptacle. The vehicle charging controller is programmed to selectively actuate the plurality of low-loss switching devices based on the charging voltage of the charging station in order to electrically connect the first rechargeable energy storage device and the first rechargeable energy storage device in series such that the nominal voltage of the reconfigurable energy storage system matches the charging voltage of the charging station. The vehicle charging controller is programmed to selectively actuate the plurality of low-loss switching devices based on the charging voltage of the charging station in order to electrically connect the first rechargeable energy storage device and the second rechargeable energy storage device in parallel such that the nominal voltage of the reconfigurable energy storage system matches the charging voltage of the charging station. The low-loss switching devices includes a first low-loss switching device, a second low-loss switching device, and a third low-loss switching device. Each of the first low-loss switching device, the second low-loss switching device, and the third low-loss switching device is selectively connected to the first rechargeable energy storage device and the second rechargeable energy storage device. Each of the first low-loss switching device, the second low-loss switching device, and the third low-loss switching device is in communication with the vehicle charging controller. Each of the first low-loss switching device, the second low-loss switching device, and the third low-loss switching device has an on-state and an off-state. The vehicle charging controller is programmed to determine the charging voltage of the charging station based on the wireless signal received from the charging station, the charging voltage of the charging station is one of a first voltage or a second voltage, the second voltage is greater than the first voltage. The vehicle charging controller is programmed to determine that the charging voltage of the charging station is the first voltage. The vehicle charging controller is programmed to command the first low-loss switching device and the second low-loss switching device to be in the on-state and to command the third low-loss switching device to be in the off-state, thereby electrically connecting the first rechargeable energy storage device and the second rechargeable energy storage device in parallel in response to determining that the charging voltage of the charging station is the first voltage. The vehicle charging controller is programmed to determine that the charging voltage of the charging station is the first voltage, the vehicle charging controller is programmed to command the first low-loss switching device and the second low-loss switching device to be in the off-state and to command the third low-loss switching device to be in the on-state, thereby electrically connecting the first rechargeable energy storage device and the second rechargeable energy storage device in series in response to determining that the charging voltage of the charging station is the second voltage. The vehicle charging controller is in communication with the first rechargeable energy storage device such that the vehicle charging controller is programmed to determine that the first rechargeable energy storage device is faulty. In response to determining that the first rechargeable energy storage device is faulty, the vehicle charging controller is programmed to command the first low-loss switching device and the third low-loss switching device to be in the off-state and to command the second low-loss switching device to be in the on-state to bypass the first rechargeable energy storage device that is faulty. The vehicle charging controller is in communication with the second rechargeable energy storage device such that the vehicle charging controller is programmed to determine that the second rechargeable energy storage device is faulty. In response to determining that the second rechargeable energy storage device is faulty, the vehicle charging controller is programmed to command the second low-loss switching device and the third low-loss switching device to be in the off-state and to command the first low-loss switching device to be in the on-state to bypass the second rechargeable energy storage device that is faulty.

The present disclosure also describes a method for flexible DC fast charging of an electrified vehicle. The method includes providing the electrified vehicle. The electrified vehicle includes a vehicle charging controller, a charge receptacle, a reconfigurable energy storage system is in communication with the vehicle charging controller. The reconfigurable energy storage system is electrically connected to the charge receptacle. The reconfigurable energy storage system includes a first rechargeable energy storage device selectively and electrically connected to the charge receptacle, a first rechargeable energy storage device selectively and electrically connected to the charge receptacle, and a plurality of low-loss switching devices selectively connected to the first rechargeable energy storage device and the second rechargeable energy storage device. The method also includes commanding, via the vehicle charging controller, the plurality of low-loss switching devices to selectively actuate based on a voltage of a charging station such that a nominal voltage of the reconfigurable energy storage system matches the charging voltage of the charging station after the charge receptacle is electrically connected to a charge port of the charging station. The step of commanding, via the vehicle charging controller, the plurality of low-loss switching devices to selectively actuate includes electrically connecting the first rechargeable energy storage device and the second rechargeable energy storage device in series such that the nominal voltage of the reconfigurable energy storage system matches the charging voltage of the charging station.

The above features and advantages and other features and advantages of the present disclosure are readily apparent from the following detailed description of the best modes for carrying out the disclosure when taken in connection with the accompanying drawings.

DETAILED DESCRIPTION

Figure 1:
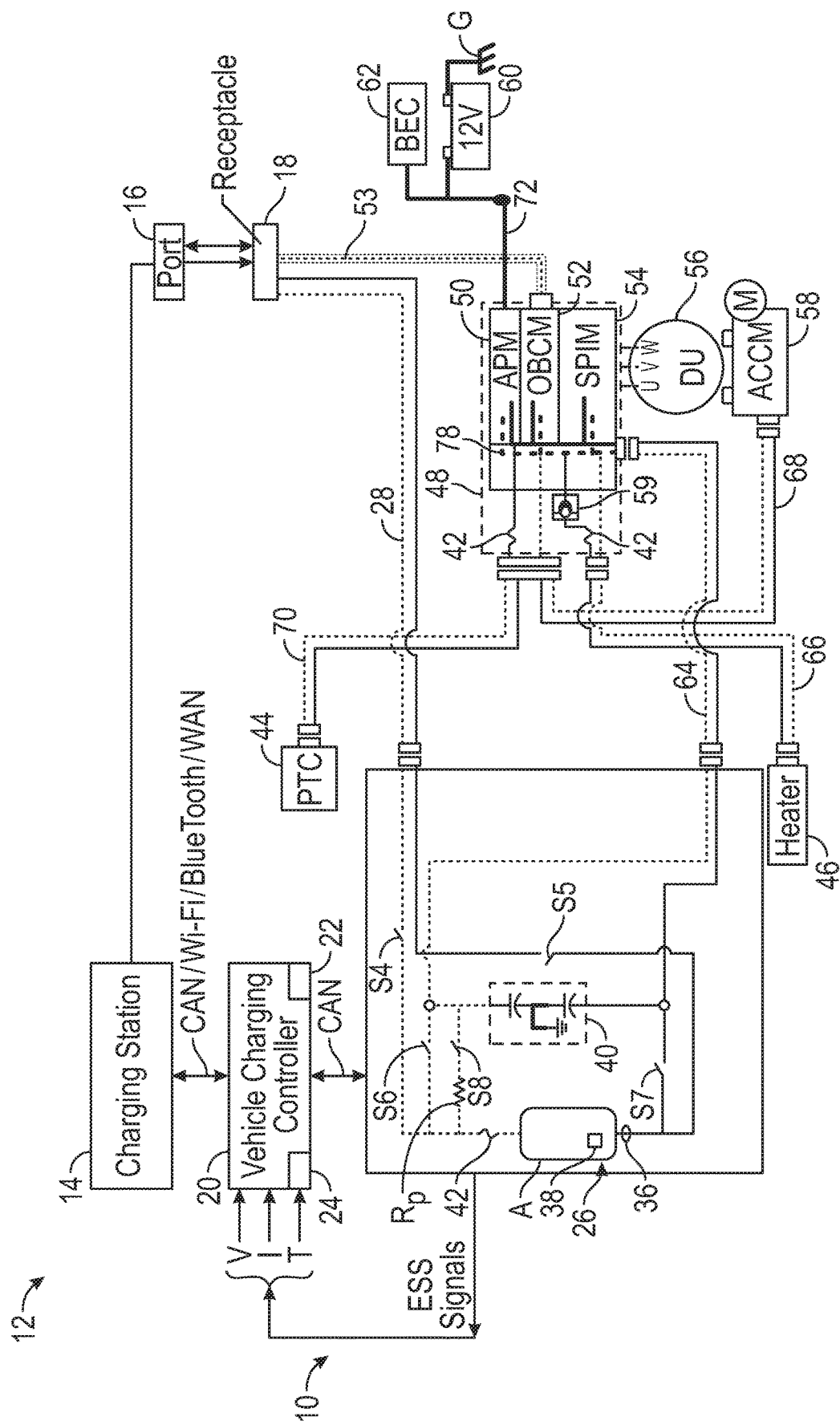
FIG. 1 is a schematic diagram of an apparatus for flexible DC fast charging of an electrified vehicle.
Figure 2:
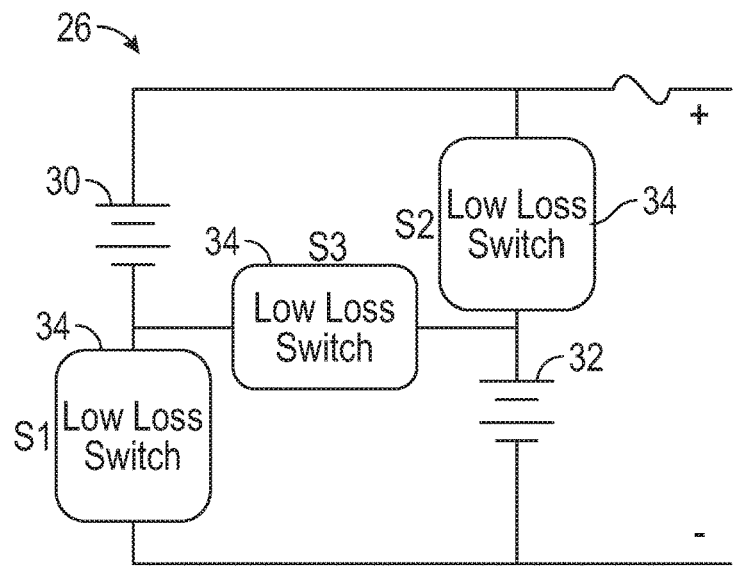
FIG. 2 is a schematic diagram of a part of the reconfigurable energy storage system of the apparatus of FIG. 1, taken around area A of FIG. 1, wherein the reconfigurable energy storage system includes a first rechargeable energy storage device, a second rechargeable energy storage device, and a plurality of low-loss switching devices.

With reference to FIGS. 1 and 2, the present disclosure describes an apparatus 10 for flexible DC fast charging of an electrified vehicle 12. The apparatus 10 is part of the electrified vehicle 12, which may be a hybrid vehicle or a plug-in electric vehicle. By employing the apparatus 10, the charging time of the electrified vehicle 12 can be minimized when connected to a high power direct current (DC) fast charging station 14. The voltage of the high-power DC fast charging station 14 may be 800 volts. The charging station 14 includes a charge port 16 capable of supplying a DC voltage or an alternating current (AC) voltage or both. The apparatus 10 includes a charge receptacle 18 configured to receive the charge port 16 to electrically charge the electrified vehicle 12. The charge receptacle 18 can therefore receive AC voltage and/or DC voltage. In addition, the charge receptacle 18 may be configured to communicate with the charge station 14 through the charge port 16. As such, the charge receptacle 18 may receive and send communication and port verification signals from the charge port 16.

The electrified vehicle 12 includes a vehicle charging controller 20 to establish a wireless and/or wired communication link with the charging station 14. A communication network (such as CAN, WAN, Blue-Tooth, Wi-Fi), can establish the wireless and/or wired communication between the charging station 14 and the vehicle charging controller 20. As a result, the vehicle charging controller 20 can communicate wirelessly and/or via wire with the vehicle charging station 14. The electrified vehicle 12 may also include a Global Positioning System (GPS) to determine the location of the electrified vehicle 12 with respect to the charging station 14. The vehicle charging controller 20 includes a processor 22 and a non-transitory memory 24 in communication with the processor 22. The non-transitory memory 24 can store instructions that can be executed by the processor 22. The vehicle charging controller 20 is programmed to determine the charging voltage of the charging station 14 based on the communication signal received from the charging station 14. This communication signal is indicative of the charging voltage of the charging station 14. The charging voltage may be, for example, a low voltage (e.g., 400 volts) or a high voltage (e.g., 800 volts). In the present disclosure, the low voltage is referred to as the first voltage, and the high voltage is referred to as the second voltage. The high voltage (i.e., the second voltage) is greater than the first voltage (i.e., low voltage). The vehicle charging controller 20 can also send current requests to the charging station 14 to electrically charge the electrified vehicle 12. The apparatus 10 includes a reconfigurable energy storage system 26 selectively and electrically connected to the charge receptacle 18 via a first DC wiring 28.

With specific reference to FIG. 2, the reconfigurable energy storage system 26 includes a first rechargeable energy storage device 30 and a second rechargeable energy storage device 32. In the present disclosure, the term "rechargeable energy storage device" refers to devices that are rechargeable and capable of storing electrical energy, such as ultra-capacitors, batteries, battery packs, battery cells, or any combination thereof. Each of the first rechargeable energy storage device 30 and the second rechargeable energy storage device 32 is selectively and electrically connected to the charge receptacle 18 (FIG. 1). The reconfigurable energy storage system 26 further includes a plurality of low-loss switching devices 34 selectively connected to the first rechargeable energy storage device 30 and the second rechargeable energy storage device 32. Each of the plurality of low-loss switching devices 34 is in communication with the vehicle charging controller 20. As a result, the vehicle charging controller 20 can control the operation of the low-loss switching devices 34. In the present disclosure, the term "low-loss switching device" means a solid state relay and/or an electromechanical relay. A solid state relay has no moving parts but instead uses the electrical and optical properties of solid state semiconductors to perform its input to output isolation and switching functions. As non-limiting examples, solid state relays include MOS-controlled Thyristors (MCTs), gallium-nitride (GaN) field-effect transistors (FETs), metal-oxide-semiconductor field-effect transistors (MOSFETs), silicon carbide junction field-effect transistors (SiC JFETs), insulated-gate bipolar transistors (IGBTs) or any other suitable low loss device of suitable voltage and current ratings. The low-loss switching devices 34 may be electromechanical relays in parallel with solid state switches to further reduce the on-state conduction loses. During operation, the solid state switches carry the current during switching from on-to-off or off-to-on state of the electromechanical relay to eliminate arcing. The term "low-loss switching device" does not include strictly mechanical switches, because it is desirable to minimize the risk of the mechanical contacts from welding together. The low-loss switching devices 34 are optimized for low voltage drop and eliminate arcing during switching. The vehicle charging controller 20 is programmed to selectively actuate the plurality of low-loss switching devices 34 based on the charging voltage of the charging station 14 such that a nominal voltage (Vbatt) of the reconfigurable energy storage system 26 matches the charging voltage of the charging station 14.

In the depicted embodiment, the low-loss switching devices 34 includes a first low-loss switching device 51, a second low-loss switching device S2, and a third low-loss switching device S3. Each of the first low-loss switching device 51, the second low-loss switching device S2, and the third low-loss switching device S3 is selectively connected to the first rechargeable energy storage device 30 and the second rechargeable energy storage device 32. Each of the first low-loss switching device S1, the second low-loss switching device S2, and the third low-loss switching device S3 is in communication with the vehicle charging controller 20. Each of the first low-loss switching device S1, the second low-loss switching device S2, and the third low-loss switching device S3 has an on-state and an off-state.

Figure 3:
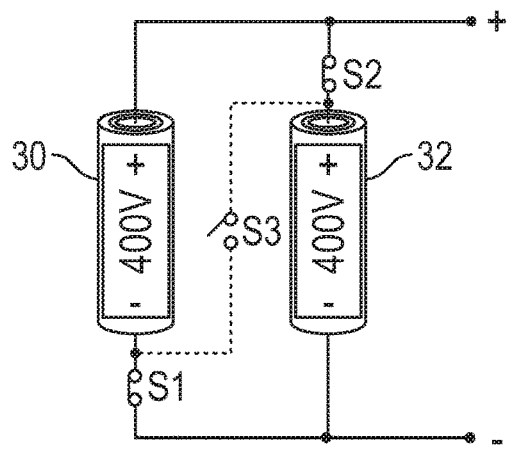
FIG. 3 is a schematic diagram of the reconfigurable energy storage system of FIG. 2, showing the first rechargeable energy storage device and the second rechargeable energy storage device electrically connected in parallel.

With reference to FIGS. 2 and 3, the vehicle charging controller 20 is programmed to determine that the charging voltage of the charging station 14 is the first voltage (i.e., the first voltage, which may be 400 volts). In response to determining that the charging voltage of the charging station 14 is the low voltage (e.g., 400 volts), the vehicle charging controller 20 is programmed to command the first low-loss switching device S1 and the second low-loss switching device S2 to be in the on-state and to command the third low-loss switching device S3 to be in the off-state, thereby electrically connecting the first rechargeable energy storage device 30 and the second rechargeable energy storage device 32 in parallel. Because the first rechargeable energy storage device 30 and the second rechargeable energy storage device 32 are electrically connected in parallel, the nominal voltage of the reconfigurable energy storage system 26 matches the charging voltage of the charging station 14, thereby allowing the normal charging operation of the electrified vehicle 12 without compromising the electrical components of the apparatus 10, which are designed for the low voltage (e.g., 400 volts).

Figure 4:
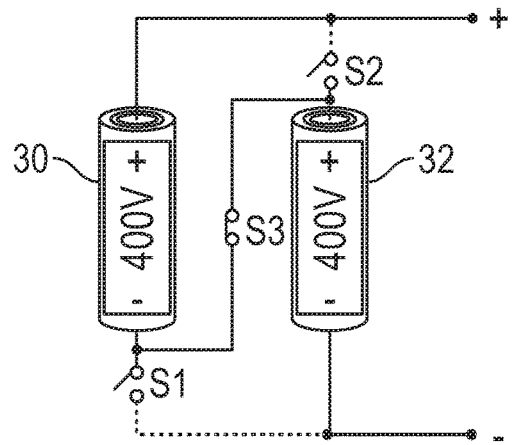
FIG. 4 is a schematic diagram of the reconfigurable energy storage system of FIG. 2, showing the first rechargeable energy storage device and the second rechargeable energy storage device electrically connected in series.

With reference to FIGS. 2 and 4, the vehicle charging controller 20 is programmed to determine that the charging voltage of the charging station 14 is the high voltage (e.g., the second voltage, which may be 800 volts). The vehicle charging controller 20 is programmed to command the first low-loss switching device S1 and the second low-loss switching device S2 to be in the off-state and to command the third low-loss switching device S3 to be in the on-state, thereby electrically connecting the first rechargeable energy storage device 30 and the second rechargeable energy storage device 32 in series in response to determining that the charging voltage of the charging station 14 is the second voltage (e.g., the second voltage, which may be 800 volts). Because the first rechargeable energy storage device 30 and the second rechargeable energy storage device 32 are electrically connected in series, the nominal voltage of the reconfigurable energy storage system 26 matches the charging voltage of the charging station 14 (e.g., 800 volts), thereby allowing the fast DC charging of the electrified vehicle 12 without compromising the electrical components of the apparatus 10, which are designed for the low voltage (e.g., 400 volts). Thus, the first rechargeable energy storage device 30 and the second rechargeable energy storage device 32 are identical and can be connected in parallel for normal charging or in series for fast DC charging of the electrified vehicle 12. Further, if and solely if the voltage of the charging station 14 is 400 volts, but the nominal voltage of the reconfigurable energy storage system 26 is 800 volts, the vehicle charging controller 20 selectively actuates the first low-loss switching device S1, the second low-loss switching device S2, and the third low-loss switching device S3 to match voltage of the reconfigurable energy storage system 26 of the charging station 14. Also, if and solely if the voltage of the charging station 14 is 800 volts, the vehicle charging controller 20 selectively actuates the first low-loss switching device S1, the second low-loss switching device S2, and the third low-loss switching device S3 to match voltage of the reconfigurable energy storage system 26 of the charging station 14

Figure 5:
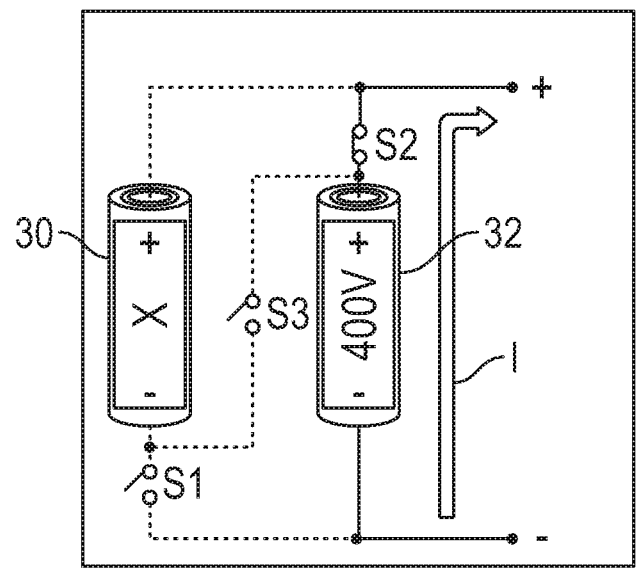
FIG. 5 is a schematic diagram of the reconfigurable energy storage system, showing electricality flowing through the second rechargeable energy storage device and bypassing the second rechargeable energy storage device.

With reference to FIGS. 2 and 5, the vehicle charging controller 20 is programmed to determine whether the first rechargeable energy storage device 30 is faulty. In the present disclosure, the term "faulty" means that an energy storage device cannot be recharged, that the energy storage device cannot supply voltage, that the temperature of the energy storage device is above a predetermined upper threshold, that the temperature of the energy storage device is below a predetermined lower threshold, or any other condition that prevents the energy storage device from functioning as intended. In response to determining that the first rechargeable energy storage device 30 is faulty, the vehicle charging controller 20 is programmed to command the first low-loss switching device S1 and the third low-loss switching device S3 to be in the off-state and to command the second low-loss switching device S2 to be in the on-state to bypass the first rechargeable energy storage device 30, which is faulty. As a consequence, the electrical current I passes through the second rechargeable energy storage device 32 but bypasses the first rechargeable energy storage device 30.

With reference to FIG. 2, the vehicle charging controller 20 is programmed to determine that the second rechargeable energy storage device 32 is faulty. In response to determining that the second rechargeable energy storage device 32 is faulty, the vehicle charging controller 20 is programmed to command the second low-loss switching device S2 and the third low-loss switching device S3 to be in the off-state and to command the first low-loss switching device S1 to be in the on-state to bypass the second rechargeable energy storage device 32, which is faulty. Thus, the electrical current I passes through the first rechargeable energy storage device 30 but bypasses the second rechargeable energy storage device 32.

With reference again to FIG. 1, the reconfigurable energy storage system 26 is in communication (e.g., electronic communication) with the vehicle charging controller 20. A controller area network (CAN) can establish the wired or wireless communication between the reconfigurable energy storage system 26 and the vehicle charging controller 20. Thus, the reconfigurable energy storage system 26 can send energy storage system (ESS) signals to the vehicle charging controller 20. For example, the ESS signals may include signals indicative of the temperature T, the voltage V, and the current I of the reconfigurable energy storage system 26. The reconfigurable energy storage system 26 may include a current sensor 36 configured to measure the current I of the reconfigurable energy storage system 26. The reconfigurable energy storage system 26 may include a temperature sensor 38 configured to measure the temperature T of the reconfigurable energy storage system 26. The reconfigurable energy storage system 26 may include a Y-capacitor 40 to minimize electromagnetic noise. The reconfigurable energy storage system 26 may also include a fuse 42 for protection. The reconfigurable energy storage system 26 may also include additional switching devices S4, S5, S6, S7, and S8. The switching devices S4 and S5 selectively and electrically connects the charge receptacle 18 to the reconfigurable energy storage system 26. Thus, the switching devices S4 and S5 are selectively and electrically connected to the first DC wiring 28. The reconfigurable energy storage system 26 also includes a pre-charge circuit, which includes a resistor Rp and a switching device S8. Before DC Fast charging the electrified vehicle 12, the switching devices S6, S7 and S8 are in the off-state, thereby preventing inverse current from the first rechargeable energy storage device 30 and the second rechargeable energy storage device 32 to an onboard charging module (OBCM) 52. The OBCM 52 converts the AC power from the charge port receptacle 18 via wires 53 to DC power at its output which is connected to the propulsion system DC Power Bus 78 inside the Power Electronics Bay (PEB) 48.

The apparatus 10 includes a positive temperature coefficient (PTC) heating element 44 for heating the passenger cabin of the vehicle 12. The apparatus 10 further includes a heater 46 for heating the reconfigurable energy storage system 26. Further, the apparatus 10 includes a power electronics bay (PEB) 48 with internal propulsion system DC Power Bus 78. The PEB 48 includes an auxiliary power module (APM) 50 for providing power to the vehicle accessories, such as the radio. The input of the APM 50 is connected to the propulsion system DC Power Bus 78. The output of the APM 50 is electrically connected to a 12-volt battery 60, which is grounded via the ground G. The output of the APM 50 is also electrically connected to the bussed electrical center (BEC) 62, which can distribute power to the vehicle accessories. The input of the APM 50 or the propulsion system DC Power Bus 78 can be supported by the AC charging port 16 via the OBCM 52, which maintains the nominal 400V bus voltage on the propulsion system DC Power Bus 78 for the APM 50 and the air conditioning control module (ACCM) 58 if a higher voltage (i.e., 800 volts) charging is used. The PEB 48 also includes the OBCM 52, which is capable of receiving AC voltage from the charging station 14 via the charge receptacle 18. Accordingly, an AC wiring 53 electrically interconnects the charge receptacle 18 and the OBCM 52. The PEB 48 also includes a single power inverter module (SPIM) 54 for changing DC current to 3-phase or multi-phase AC current. The PEB 48 also includes a switching device 59 between the propulsion system DC Power Bus 78 and the heater 46. The PEB 48 also includes a fuse 42 between the PTC heating element 44 and the propulsion system DC Power Bus 78 for protection. In addition, another fuse 42 may be electrically connected between the switching device 59 and the heater 46 for protection. Before charging, it is desirable to heat the reconfigurable energy storage system 26 to facilitate charging the first rechargeable energy storage device 30 and the second rechargeable energy storage device 32. The vehicle charging controller 20 can therefore control the switching device 59 to supply electrical energy to the heater 46 from the propulsion system DC Power Bus 78.

The SPIM 54 is electrically connected to the drive unit 56 through the terminals U, V, W. The drive unit 56 includes gears and an electric motor to propel the electrified vehicle 12. The propulsion system DC Power Bus 78 is electrically connected to the ACCM 58, which is configured to control the air conditioning of the passenger cabin of the vehicle 12. The ACCM 58 supplies an electric machine M that drives the air-conditioning compressor.

During normal charging, switching devices S4 and S5 are on the off-state, switching devices S6 and S7 are on the on-state, and charging current is supplied to the first rechargeable energy storage device 30 and the second rechargeable energy storage device 32 through the AC wiring 53 and the OBCM 52. During 400V DC fast charging, switching devices S4, S5, S6 and S7 are on the on-state, and the current flows from the charge receptacle 18, through the first DC wiring 28, and to the first rechargeable energy storage device 30 and the second rechargeable energy storage device 32. A second DC wiring 64 electrically interconnects the PEB 48 and the reconfigurable energy storage system 26. In case of 800V DC Fast Charging, the OBCM 52 can be active and switching devices S6, S7 and S8 are in the off-state. The input to APM 50 via propulsion system DC Power Bus 78 can be supplied via the OBCM 52, which maintains the nominal 400 volts bus voltage for the APM 50 and the ACCM 58 if the 800V fast DC charging is employed. A third DC wiring 66 electrically interconnects the heater 46 and the output of the switching device 59 in the PEB 48. A fourth DC wiring 68 electrically interconnects the ACCM 58 and the propulsion system DC Power Bus 78. A fifth DC wiring 70 electrically interconnects the propulsion system DC Power Bus 78 and the PTC heating element 44. A bus 72 electrically connects the output of the APM 50 to the BEC 62 and the 12-volt battery 60. The energy storage system 26 is coupled to the SPIM 54 through switching devices S6, S7 and the pre-charge circuit (i.e., switching device S8 and resistor Rp) via second DC wiring 64.

Figure 6:
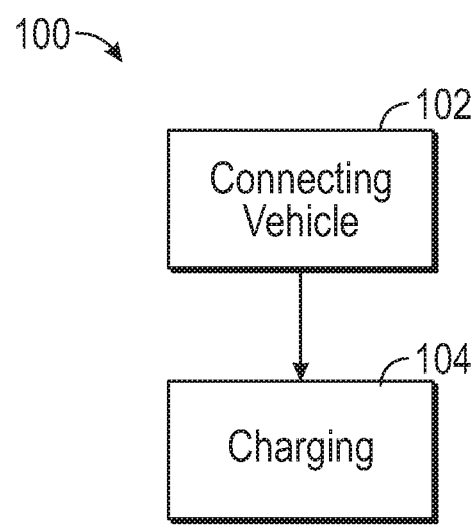
FIG. 6 is a flowchart of a method for flexible DC fast charging of an electrified vehicle.

FIG. 6 is a flowchart of a method 100 for flexible DC fast charging of the electrified vehicle 12. The method 100 begins at step 102, which entails providing the electrified vehicle 12. In addition, step 102 entails electrically connecting the electrified vehicle 12 to the charging station 14 to electrically charge the electrified vehicle 12. Then, the method 100 proceeds to step 104. At step 104, the vehicle charging controller 20 commands the low-loss switching devices 34 to selectively actuate based on the charging voltage of the charging station 14 as discussed above. Specifically, the vehicle charging controller 20 commands the low-loss switching devices 34 to selectively actuate such that a nominal voltage of the reconfigurable energy storage system 26 matches the charging voltage of the charging station 14 after the charge receptacle 18 is electrically connected to the charge port 16 of the charging station 14. In this step, the vehicle charging controller 20 then commands the low-loss switching devices 34 to selectively actuate to electrically connect the first rechargeable energy storage device 30 and the second rechargeable energy storage device 32 in series or in parallel such that the nominal voltage of the reconfigurable energy storage system 26 matches the charging voltage of the charging station 14.

While the best modes for carrying out the disclosure have been described in detail, those familiar with the art to which this disclosure relates will recognize various alternative designs and embodiments for practicing the disclosure within the scope of the appended claims.

What is claimed is:

1. An electrified vehicle comprising:
    a reconfigurable energy storage system configured to receive a charging current while the electrified vehicle is charging, the reconfigurable energy storage system comprising a first rechargeable energy storage device and a second rechargeable energy storage device; and
    an inverter selectively and electrically connected to the reconfigurable energy storage system, the inverter being configured to receive a direct current power from the reconfigurable energy storage system while the electric vehicle is moving, and generate a multi-phase alternating current from the direct current power to propel the electrified vehicle, wherein:
        the first rechargeable energy storage device and the second rechargeable energy storage device are connected in series while the electrified vehicle is charging;
        the first rechargeable energy storage device and the second rechargeable energy storage device are charged with the charging current while the electrified vehicle is charging;
        the first rechargeable energy storage device and the second rechargeable energy storage device are connected in parallel while the electrified vehicle is moving; and
        the direct current power is transferred from the reconfigurable energy storage system to the inverter while the electrified vehicle is moving.

2. The electrified vehicle according to claim 1, further comprising a plurality of switching devices configured to electrically connect the reconfigurable energy storage system to the inverter while the electrified vehicle is moving, and electrically disconnect the reconfigurable energy storage system from the inverter while the electrified vehicle is charging.

3. The electrified vehicle according to claim 1, further comprising a vehicle charging controller electrically connected to the reconfigurable energy storage system, the vehicle charging controller being configured to control the reconfigurable energy storage system to connect the first rechargeable energy storage device and the second rechargeable energy storage device in series while the electrified vehicle is charging, and in parallel while the electrified vehicle is moving.

4. The electrified vehicle according to claim 3, wherein the vehicle charging controller is further configured to control the reconfigurable energy storage system to charge the first rechargeable energy storage device and the second rechargeable energy storage device with the charging current while the electrified vehicle is charging, and transfer the direct current power from the reconfigurable energy storage system to the inverter while the electrified vehicle is moving.

5. The electrified vehicle according to claim 1, wherein the direct current power has a first voltage, the charge current is received at a second voltage, and the second voltage is higher than the first voltage.

6. The electrified vehicle according to claim 1, further comprising a charge receptacle selectively and electrically connected to the reconfigurable energy storage system, the charge receptacle being configured to receive the charging current from a charging station.

7. The electrified vehicle according to claim 6, further comprising a plurality of switching devices configured to electrically connect the charge receptacle to the reconfigurable energy storage system while the electrified vehicle is charging, and electrically disconnect the charge receptacle from the reconfigurable energy storage system while the electrified vehicle is moving.

8. The electrified vehicle according to claim 6, further comprising an onboard charging module electrically connected to the charge receptacle, the onboard charging module being configured to receive an alternating current power through the charge receptacle, and generate the direct current power from the alternating current power while the electrified vehicle is charging.

9. The electrified vehicle according to claim 1, further comprising:
    a plurality of accessories; and
    an auxiliary power module configured to convert the direct current power to a lower voltage suitable to power the plurality of accessories.

10. A method of operation in an electrified vehicle comprising:
    receiving a charging current at a reconfigurable energy storage system while the electrified vehicle is charging, the reconfigurable energy storage system comprising a first rechargeable energy storage device and a second rechargeable energy storage device;
    connecting the first rechargeable energy storage device and the second rechargeable energy storage device in series while the electrified vehicle is charging;
    charging the first rechargeable energy storage device and the second rechargeable energy storage device with the charging current while the electrified vehicle is charging;
    connecting the first rechargeable energy storage device and the second rechargeable energy storage device in parallel while the electrified vehicle is moving;
    transferring a direct current power from the reconfigurable energy storage system to an inverter while the electrified vehicle is moving; and
    generating a multi-phase alternating current from the direct current power to propel the electrified vehicle.

11. The method according to claim 10, further comprising:
    electrically connecting the reconfigurable energy storage system to the inverter while the electrified vehicle is moving; and
    electrically disconnecting the reconfigurable energy storage system from the inverter while the electrified vehicle is charging.

12. The method according to claim 10, wherein the direct current power has a first voltage, the charge current is received at a second voltage, and the second voltage is higher than the first voltage.

13. The method according to claim 10, further comprising:
   receiving the charging current at a charge receptacle of the electrified vehicle from a charging station; and
   transferring the charging current from the charge receptacle to the reconfigurable energy storage system.

14. The method according to claim 13, further comprising:
   electrically connecting the charge receptacle to the reconfigurable energy storage system while the electrified vehicle is charging; and
   electrically disconnecting the charge receptacle from the reconfigurable energy storage system while the electrified vehicle is moving.

15. The method according to claim 13, further comprising:
   receiving an alternating current power through the charge receptacle; and
   generating the direct current power from the alternating current power while the electrified vehicle is charging.

16. The electrified vehicle according to claim 10, further comprising:
   converting the direct current power to a lower voltage suitable to power a plurality of accessories of the electrified vehicle.

17. An apparatus for operating an electrified vehicle, the apparatus comprising:
   a charge receptacle configured to receive a charging current from a charging station;
   a reconfigurable energy storage system configured to receive the charging current from the charge receptacle while the electrified vehicle is charging, the reconfigurable energy storage system comprising a first rechargeable energy storage device and a second rechargeable energy storage device;
   an inverter selectively and electrically connected to the reconfigurable energy storage system, the inverter being configured to receive a direct current power from the reconfigurable energy storage system while the electrified vehicle is moving, and generate a multiphase alternating current from the direct current power to propel the electrified vehicle; and
   a vehicle charging controller electrically connected to the reconfigurable energy storage system, wherein the vehicle charging controller is configured to control the reconfigurable energy storage system to:
      connect the first rechargeable energy storage device and the second rechargeable energy storage device in a first arrangement while the electrified vehicle is charging;
      charge the first rechargeable energy storage device and the second rechargeable energy storage device with the charging current while the electrified vehicle is charging;
      connect the first rechargeable energy storage device and the second rechargeable energy storage device in a second arrangement while the electrified vehicle is moving; and
      transfer the direct current power from the reconfigurable energy storage system to the inverter while the electrified vehicle is moving.

18. The apparatus according to claim 17, wherein the first arrangement is in series and the second arrangement is in parallel.

19. The apparatus according to claim 17, wherein the first arrangement is in parallel and the second arrangement is in series.

20. The apparatus according to claim 17, wherein the vehicle charging controller is configured to receive a communication signal from the charging station, and control connection of the first rechargeable energy storage device and the second rechargeable energy storage device in response to the communication signal.

* * * * *